United States Patent [19]

Murphy et al.

[11] Patent Number: 5,133,984

[45] Date of Patent: Jul. 28, 1992

[54] PROCESS FOR PREPARING BAKED GOODS USING HYDRATED POLYSACCHARIDE HYDROCOLLOID, INSOLUBLE FIBER AND PROTEIN

[75] Inventors: Gregory B. Murphy, Sands Point; William J. Entenmann, Islip; Kevin W. Lang, Lloyd Neck; Barry N. Frake, Northport, all of N.Y.

[73] Assignee: Kraft General Foods, Inc., Glenview, Ill.

[21] Appl. No.: 540,433

[22] Filed: Jun. 15, 1990

Related U.S. Application Data

[63] Continuation-in-part of Ser. No. 366,902, Jun. 15, 1989, abandoned.

[51] Int. Cl.⁵ .......................... A23L 1/10; A21D 8/02
[52] U.S. Cl. .................................... 426/496; 426/506; 426/549; 426/556; 426/653; 426/656; 426/658; 426/804
[58] Field of Search .............. 426/496, 506, 549, 556, 426/653, 656, 658, 804

[56] References Cited

U.S. PATENT DOCUMENTS

| | | | |
|---|---|---|---|
| 3,234,027 | 2/1966 | Jertson et al. | |
| 3,574,634 | 4/1971 | Singer | |
| 3,676,150 | 7/1972 | Glicksman et al. | 426/62 |
| 4,109,018 | 8/1978 | Thompson | 426/62 |
| 4,109,025 | 8/1978 | Lauck | 426/551 |
| 4,143,163 | 3/1979 | Hutchinson et al. | 426/96 |
| 4,198,438 | 4/1980 | Singer et al. | 426/549 |
| 4,219,580 | 8/1980 | Torres | 426/549 |
| 4,308,294 | 12/1981 | Rispoli et al. | 426/294 |
| 4,424,237 | 1/1984 | Wittman | 426/653 |
| 4,431,681 | 2/1984 | Hegedus et al. | 426/553 |
| 4,451,490 | 5/1984 | Silverman et al. | 426/553 |
| 4,503,083 | 3/1985 | Glicksman et al. | 426/553 |
| 4,590,026 | 5/1986 | Titcomb et al. | 426/62 |
| 4,774,099 | 9/1988 | Feeney et al. | 426/552 |
| 4,824,683 | 4/1989 | Hodgson et al. | 426/62 |
| 4,847,108 | 7/1989 | Inoue et al. | 426/653 |
| 4,892,762 | 1/1990 | Abdelrahman | 426/549 |
| 4,971,823 | 11/1990 | Fahlen | 426/549 |

FOREIGN PATENT DOCUMENTS

| | | |
|---|---|---|
| 340035 | 11/1989 | European Pat. Off. |
| 89/01813 | 11/1989 | PCT Int'l Appl. |

OTHER PUBLICATIONS

Slim-Fast Nutritional Meal, Thompson Medical Company.
Tressler et al. Food Products Formulogy vol. 2, AVI Publishing, 1975 pp. 25, 118–19.

*Primary Examiner*—Donald E. Czaja
*Assistant Examiner*—Evan Federman
*Attorney, Agent, or Firm*—Thomas R. Savoie

[57] ABSTRACT

Doughs and batters are prepared which contain hydrated polysaccharide hydrocolloid hydrated insoluble fiber and hydrated protein preferably at a weight ratio of 1:0.8–6:1.1–4.5. The hydrated materials are added to the dough or batter formulation as an aqueous dispersion. The resulting dough and batter can be baked in a conventional manner. This invention is particularly useful in the preparation of fat-free baked goods.

37 Claims, No Drawings

PROCESS FOR PREPARING BAKED GOODS USING HYDRATED POLYSACCHARIDE HYDROCOLLOID, INSOLUBLE FIBER AND PROTEIN

RELATED APPLICATION

This application is a continuation-in-part of U.S. Ser. No. 366,902 filed Jun. 15, 1989, now abandoned.

TECHNICAL FIELD

Our invention relates to the production of doughs and batters for producing baked goods, particularly reduced-fat and fat-free baked goods having a shelf-life, softness, and acceptance comparable to their full-fat counterparts. Our invention can also find utility for producing fat-containing baked goods which have improved shelf-life.

While it may be possible to merely remove or lower the fat component of some baked goods and still obtain an edible product from the oven, these fat-free or reduced-fat baked goods tend to rapidly stale and are of little commercial use. Also, removing or reducing the fat from baked goods formulations may change the properties of the dough or batter such that normal bakery processing is made difficult. Thus, commercially-acceptable ways to reduce or eliminate fat from baked goods are much sought after. Also, techniques to improve the shelf-life of conventional, full-fat baked goods is a much sought after goal.

BACKGROUND ART

Many prior art disclosures recite the incorporation of materials such as gums, cellulosic fiber or protein into batter and dough formulations. These teachings, however, have not enabled the production of high-quality, no-fat or reduced-fat baked goods which have been widely accepted in the marketplace. Among such prior art patents are: U.S. Pat. No. 3,234,027 to Jertson et al.; 3,574,634 to Singer; 4,109,018 to Thompson; 4,143,163 to Hutchinson et al.; 4,198,438 to Singer et al.; 4,219,580 to Torres; 4,424,237 to Wittman; 4,431,681 to Hegedus et al.; 4,451,490 to Silverman et al.; 4,503,083 to Glicksman et al.; 4,774,009 to Feeney et al.; 4,824,683 to Hodgson et al.; and published EPO application 340,035 and published PCT application 89/01813 both to Chen et al..

DISCLOSURE OF THE INVENTION

The present invention is directed to the use of hydrated, polysaccharide hydrocolloids in combination with hydrated insoluble fiber and protein material, in wheat flour-containing doughs and batters in order to improve the functional and/or organoleptic attributes of baked goods produced from such doughs and batters. Baked goods which incorporate the teachings of this invention have been found to have improved texture, mouthfeel, softness, moistness, moisture-retention, shelf-life, flavor-enhancement, fatty attributes and/or volume.

The use of hydrated, polysaccharide hydrocolloids, together with hydrated insoluble fiber and hydrated protein material, as taught in this invention, will find utility in a wide variety of baked goods, particularly where it is important or desired to eliminate or reduce fat content, to prevent or control moisture migration, to preserve moisture-related softness and/or mouthfeel, or to impart lubricity to the mouthfeel of the product. It is believed that the hydrated, polysaccharide hydrocolloids together with the insoluble fiber and protein materials function, in part, as a water binding material which is able to retain increased levels of moisture in the baked good without substantially increasing the water activity of the baked good.

It is speculated that the hydrated, polysaccharide hydrocolloids, insoluble fiber and protein material of this invention is able to function as a reservoir of bound moisture which is able to slowly release this moisture into the baked good as moisture is passed from the baked good to the ambient atmosphere. It is also speculated that the fiber component disrupts or reduces any gummy texture which could result from the presence of the polysaccharide hydrocolloids. Baked goods prepared in accordance with this invention will usually have an initial moisture content which is greater, typically at least 3% greater, than their conventional counterparts. This moisture differential should increase over time during normal storage and distribution of the products, as the baked goods of this invention appear to lose moisture at a slower rate than their conventional counterparts.

The polysaccharide hydrocolloids, insoluble fiber and protein are incorporated into the dough or batter composition in a hydrated state, typically in a single, preformed aqueous dispersion. It would, however, be possible to utilize separate aqueous dispersions for each of the materials to be hydrated. The addition of unhydrated polysaccharide hydrocolloids, insoluble fiber or protein directly to conventional dough or batter processes does not provide enough water and/or time to permit adequate hydration, as materials such as flour and sugars absorb large amounts of water before the polysaccharide hydrocolloids, insoluble fiber and/or protein materials are hydrated. The added aqueous dispersion should have a thick, paste-like consistency and a viscosity of at least 6, preferably at least 8 and most preferably at least 12, as measured at 40° F. (4.4° C.) using a Brookfield Model HAT Viscometer with a helipath stand and a size-D, T-Bar spindle at 5 RPMs (scale 0–100). The aqueous dispersion should also have a solids content, basis the amount of polysaccharide hydrocolloid, insoluble fiber, protein and water components present in the dispersion of from 2 to 35% by weight, preferably from 5 to 30% and most preferably from 9 to 25%. The solids content of the dispersion will be adjusted based primarily on obtaining a viscosity which is easy to handle and incorporate into the dough or batter, as well as the amount of water which may be tolerated in the dough or batter and the nature of the desired baked good.

The polysaccharide hydrocolloids used in this invention are preferably water-soluble, non-gelling gums, such as xanthan, guar, CMC (carboxymethyl cellulose) and the like. Gums which form gels, such as alginates, pectin, kappa and iota carrageenan and the like are not preferred for use in this invention. Non-polysaccharide hydrocolloids, such as gelatin, have not been found to be suitable for use in this invention.

A combination of an anionic polysaccharide hydrocolloid and a galactomannan polysaccharide hydrocolloid has been found to be preferred for use in this invention. The anionic polysaccharide will preferably include within its molecular structure dependent carboxylic acid groups. Xanthan gum and carboxymethyl cellulose are such polysaccharides. Galactomannans are polysaccharide composed solely of mannose and galactose. Guar gum, a galactomannan which has a mannose-to-galactose ratio of about 1.8:1 has proven to be well-suited for use in this invention.

Combinations of xanthan gum and guar at a weight ratio of 1:4 to 4:1, preferably 1:3 to 3:1 and most preferably about 1:1, have been found to be highly preferred for use in this invention. Xanthan gum is a high molecular weight polysaccharide which is obtained by pure culture fermentation of glucose with a bacterium of the genus *Xanthamonas*, such as *Xanthomones campestris*. Xanthan is a heteropolysaccharide made up of building blocks of D-glucose, D-mannose and D-glucuronic acid. Guar gum is isolated from the seeds of the guar bean (*Cyamoosis Tetraoonaolobas L. taub.*) which is native to India and Pakistan.

The insoluble fiber which may be employed in this invention can be any edible fiber material, including powdered cellulose (at least 95% insoluble fiber). Fiber derived from cereal grains (e.g., oat, wheat, corn, soy, etc.) is well-suited for use in this invention. Oat fiber, which contains a relatively-high level (at least 85%) of insoluble fiber, soy fiber and wheat fiber have been successfully used in the practice of this invention. The particles of fiber in the aqueous dispersions of this invention may have an average particle size of between about 10 and 200 microns, preferably between 10 and 100 microns. The size of the fiber particles will be a function of the particle size of the selected raw material and the amount of fiber particle fracture resulting from the mixing and/or homogenization employed to produce any aqueous dispersion.

The protein material which can be used in this invention may be an essentially-pure protein, as in the case of whey protein or casein, or as part of a protein containing material, such as dry non-fat milk solids, dried egg whites, soy protein, wheat protein, wheat gluten, etc. Non-fat milk solids (about 36% protein) and wheat gluten have been found to be useful in this invention. Proteins, such as casein, which form protein micelles in an aqueous dispersion should also be suitable for use in this invention. The protein may be at least partially denatured as denatured protein has higher water absorption properties than undenatured protein.

The aqueous dispersion used in the practice of this invention, may contain additional ingredients such as dispersing agents (e.g. sugars and/or maltodextrin), free-flow agents, preservative systems (e.g. potassium sorbate), flavor systems and coloring agents. Emulsifiers are not needed in the aqueous dispersions of this invention; however, if included, emulsifers would be present at a level below that of the polysaccharide hydrocolloids. The pH of the dispersion should be maintained above about 5.0 in order to avoid adverse effects upon any protein component. In any dispersion produced, according to this invention, the components of the aqueous dispersion do not form a complex. Although not preferred, the components could be hydrated separately and three dispersions added to the batter or dough formulation. The materials of this invention are thus unlike the gum-protein complexes described in the aforementioned Chen et al. disclosures.

This invention has been found to be useful in the production of baked goods, such as, but not limited to, bread-type products (e.g., breads, rolls, and bagels) sweet goods, pastries, danish, doughnuts, cakes, cookies and the like. It may be desirable to modify existing dough or batter formulations and processes in order to optimize the use of our invention, but this can be done on a product-by-product basis, as desired, by skilled bakers.

It would also be possible to dry, such as by freeze drying, any hydrocolloid-containing dispersions desired for use according to this invention. This dried material could then be hydrated prior to being incorporated into a dough or batter formulation.

All percents and ratios used throughout this disclosure are by weight and based on the dry weight of the hydrated hydrocolloid polysaccharide, insoluble fiber and/or protein. Thus, if a fiber material contains both soluble and insoluble constituents, only the weight of insoluble fiber is considered. Likewise, if a protein material, such as milk solids or vegetable protein concentrates, contain non-protein components, only the weight of the protein is considered. It should be noted that any polysaccharide hydrocolloid, insoluble fiber or protein material which is merely added in a conventional manner to a dough or batter formulation in an unhydrated state is not a component which is considered to be hydrated according to the terms of this invention. It is, however, specifically contemplated that this invention can be utilized in batter and dough formulations which do include added, unhydrated polysaccharide hydrocolloids, insoluble and/or protein materials.

This invention is particularly useful in the formulation of fat-free or reduced fat baked goods. The lubricity, softness and/or moistness provided to baked goods by fatty material, such as vegetable shortening, appears to also be provided by the aqueous dispersions disclosed herein. According to another embodiment of this invention the softness and/or moistness of conventional fat-containing baked goods may be increased or extended by addition of the aqueous dispersion to the dough or batter formulation.

According to the fat-free or reduced-fat embodiments of this invention, the dispersions of this invention may be used in place of fat at a rate of about one part hydrocolloid for each 40 to 60 parts of fat. Preferably the dispersions are prepared so that the use of the dispersion for fat will be at a ratio of 0.5–1.5:1, typically about 1:1.

As used herein, fat-free or substantially fat-free is meant that the dough or batter is free of overtly added fat materials, such as shortening. Low amounts of fat that would naturally be present from other ingredients, such as flour, or glyceride materials, such as monoglycerides, which could be present in the dough or batter as emulsifiers and/or dough conditioners are not to be excluded by the term fat-free. Baked goods which have a fat content of less than 0.5 grams per serving are considered to be included in the term "fat-free".

According to this invention, the hydrated polysaccharide hydrocolloids are included in dough or batter formulations at a level of from 0.1 to 4.0, preferably 0.25 to 2.0, parts per 100 parts of flour. For products other than high-fiber breads, the hydrated insoluble fiber is present in the dough or batter at a level of 0.1 to 5.0, preferably 0.1 to 2.0, per 100 parts of flour. The ratio of polysaccharide hydrocolloid to insoluble fiber should be from 1:0.8–3.5 in the case of cakes, pastry, danish, sweet doughs, cookies and the like; however, for producing low-calorie, high-fiber bread products it may be desired to employ a higher ratio of fiber such as 1:3.0–6.0.

Hydrated protein is included in the dough or batter formulation at a level of at least 0.1 parts per 100 parts of flour. It will be desirable that the ratio of hydrocolloid to protein in the dispersion be from 1:1.1–4.5 and that the aqueous dispersion be added to a flour or batter formulation such that the protein in the dispersion amounts to 0.1 to 8 parts per 100 parts flour. The protein content of the flour contemplated for use in this invention are within the conventional range of about 7 to 14% with the lower protein flours preferred for cakes and the higher protein flours preferred for breads.

It should be noted that caloric reduction which results from the practice of this invention can arise from the reduction of the fat level in the baked good and not replacement of flour by fiber and/or hydrocolloid. A fiber level of less than 5% by weight of the flour contained in the baked good is suitable for use in the aqueous dispersions of this invention. This fiber level is quite unlike the high-fiber, low-calorie breads known in the art.

A benefit derived from the use of a prepared aqueous dispersion is that any of the materials contained therein can be hydrated at a location or time remote from the production of the dough or batter. In this manner existing bakery processes do not have to be modified.

According to a specific embodiment of this invention, aqueous dispersions are prepared which contain polysaccharide hydrocolloid, insoluble fiber and protein at a weight ratio of 1:0.8–6.0:1.1–4.5, preferably 1:0.8–3.5:1-.5–3.5 and most preferably 1:1.5–2.0:2.0–3.0.

The process for preparing the aqueous dispersion may be any technique which both hydrates the ingredients and produces a uniform distribution of solids within a stable aqueous dispersion. The process may be accomplished in a one, two or more step operation. Most typically, however, a procedure is followed in which the dry ingredients are first combined in a batch-type mixer and the resulting mix is passed through a mixing unit which will produce a uniform aqueous dispersion, such as a homogenizer or a continuous mixer. Thereafter, the dispersion should be pasteurized such as by heating to above about 160° F. (71.1° C.) for up to ten minutes. The dispersion is preferably maintained at 40° F. (4.4° C.) or below in order to ensure microbial stability. Cooling of the dispersion below 45° F. (7.2° C.) prior to use in a dough or batter is thought to be desirable even in the event the dispersion is utilized immediately after production.

EXAMPLE 1

A series of loaf cakes were prepared using the following batter formulation:

| Ingredient | Parts (by weight) |
| --- | --- |
| Water | 15.47 |
| Frozen Egg Whites | 18.36 |
| Emulsifiers | 0.89 |
| Flavor/Color | 1.08 |
| Sucrose | 28.67 |
| Flour | 23.60 |
| Nonfat Dry Milk | 2.62 |
| Salt | 0.26 |
| Preservative | 0.11 |
| Instant Starch | 1.53 |
| Leavening Acid | 0.41 |
| Baking Soda | 0.41 |
| Added Ingredients | (as stated) |

For formulating the batters all liquid ingredients, including any aqueous dispersion, were added to a mixer first followed by sugar, flour and the remaining dry ingredients. The added ingredients were all contained in the aqueous dispersion unless otherwise noted. Mixing was continued for about one minute at high speed and the resulting batter was pumped through a continuous mixer (Oakes machine), divided into 439 gram portions and then baked into loafs at 425° F. (218.3° C.) for 5 minutes and 375° F. (190.6° C.) for about 31 minutes.

| ADDED INGREDIENTS (parts by weight) | A | B | C | D | E | F | G | H, I, J | K | L | M, N, O | P |
| --- | --- | --- | --- | --- | --- | --- | --- | --- | --- | --- | --- | --- |
| NFDM | — | 11.35 | — | — | 11.35 | 5.68 | 11.35 | — | 11.35 | 11.35 | 11.35 | 11.35 |
| Guar Gum | 0.825 | 0.824 | — | — | 0.824 | 0.412 | 0.824 | 0.824 | 1.65 | — | — | 0.825 |
| Xanthan Gum | 0.825 | 0.824 | — | — | 0.824 | 0.412 | 0.824 | 0.824 | — | 1.65 | — | 0.825 |
| Fiber | — | 3.71 | — | — | 3.71 | 1.86 | 3.71 | 3.71 (I) | 3.71 | 3.71 | 3.71 | 3.71 |
| Dextrose | — | 1.85 | — | — | 1.85 | 0.935 | 1.85 | 1.85 | 1.85 | 1.85 | 1.85 | 1.85 |
| Maltodextrin | — | 1.442 | — | — | 1.442 | 0.721 | 1.442 | 1.442 | 1.442 | 1.44 | 1.44 | 1.443 |
| Water | 98.35 | 80 | 100 | — | 80 | 90 | 80 | 80 | 80 | 80 | 80 | 80 |
| Alternate Protein | — | — | — | — | — | — | — | 4.09 | — | — | — | — |
| Lactose | — | — | — | — | — | — | — | 7.26 | — | — | — | — |
| Alternate Gum | — | — | — | — | — | — | — | — | — | — | 1.65 | — |

PROCEDURE FOR ADDITION OF ADDED INGREDIENT

A — 6.56 parts of a hydrated gum dispersion were included in the batter formulation.

B — 1.31 parts of the dry ingredients mix were added to the batter and an additional 5.25 parts of water were included in the batter formulation.

C — An additional 5.25 parts of water were added to the batter formulation.

D — No additions were made to the batter formulation.

E and F — 6.56 parts of a hydrated gum, oat fiber and protein-containing dispersion was included in batter formulation.

G — 6.56 parts of a hydrated gum, fiber and protein-containing dispersion was included in the batter formulation. The fiber was powdered cellulose, (Solka Floc ®) having an average fiber length of 35 microns and at least 95% insoluble fiber.

H — 6.56 parts of a hydrated gum, oat fiber, wheat protein isolate-containing dispersion was incorporated into the batter formulation. The wheat protein isolate (LSI ™ a product of Liberty Enterprises) was about 90% protein. Lactose was added to the dispersion as a filler.

I — Same as H with substitution of vital wheat gluten (about 80% protein) for the wheat protein isolate.

J — Same as H with substitution of egg albumen for the wheat protein isolate.

K and L — Same as E.

M — Same as L with substitution of lambda carrageenan (Viscarin GP 209 from Marine Colloids Division of FMC) for xanthan gum.

— Same as L with substitution of locust bean gum for all the xanthan gum.

O — Same as L with substitution of locust bean gum for one-half the weight of xanthan gum.

P — Gums were hydrated in 2.0 parts of water; NFDM was hydrated in 2.0 parts of water; and fiber was hydrated in 1.24 parts of water. The three dispersions and the dextrose and dextrin were incorporated into the batter formulation.

RESULTS

Basis organoleptic and appearance evaluations of samples A to D and F to P compared to "E"]standard at days 1 and 6, respectively. Differences found on day 1 were also apparent on day 6, unless otherwise noted.

| Sample | Day 1 | Day 6 |
|---|---|---|
| E (standard - most preferred overall) | Very good grain, texture appearance and mouthfeel; higher moistness than commercial, fat-containing (about 16% in batter) pound cake. | Slightly drier and less fresh than day 1; moisture and freshness better than 6-day, fat-containing pound cake. |
| A | Much stickier, slightly gummier, crumblier texture | Slightly drier. |
| B | Wooly texture; slightly more open grain; less moist. | Drier. |
| C | Rubbery texture, decreased loaf volume; not acceptable | Very dry and stale; not acceptable. |
| D | Low loaf volume, firm, dry, tough; not acceptable. | Very firm and dry; not acceptable. |
| F | Slight tunnelling of grain, airier, poor eye appeal, sticky top, good moisture. | Some mold growth. |
| G | Top of loaf slightly uneven and rougher, slightly drier. | Same. |
| H | Good eye appeal, slightly drier mouthfeel. | Drier texture and mouthfeel. |
| I | Less tough and gummy; good grain and texture. | Very good quality loaf |
| J | Slightly tougher, good eye appeal. | Slight off-flavor. |
| K | Spongy, some tunnelling, slightly gummy, dry mouthfeel, good grain. | Sticky top. |
| L | Slightly pilly, spongy, less moist, slightly gummy. | Very sticky top. |
| M | Dry and crumbly; very short break. | Drys out mouth; hard to swallow. |
| N | Very crumbly, short break, poor eye appeal. | Same. |
| O | Crumbly, short break, good eye appeal. | Same. |
| P | Slightly less moist. | Close to standard, slightly pilly, slightly drier. |

EXAMPLE 2

An aqueous dispersion was produced with the following composition:

| Ingredient | (Weight %) |
|---|---|
| Water | 79.7 |
| Xanthan gum | 1.0 |
| Guar gum | 1.0 |
| Dextrose | 2.3 |
| Oat fiber (88.4% insoluble fiber) | 3.6 |
| Milk solids non-fat (36% protein) | 12.4 |

The dispersion was prepared by thoroughly blending all the dry ingredients and then, using a Hobart TM A-200 mixer with a 20-quart bowl and a wire whip, mixing all of the ingredients for 30 seconds on 2nd speed. This pre-mix was then passed through a Gaulin TM laboratory homogenizer (14M-8TA) at 1500 psi 1st stage and 500 psi 2nd stage. The resulting product was a smooth aqueous dispersion with a moisture content of 81.5% and a pH of 6.7.

EXAMPLE 3

A loaf cake was prepared with the following batter formuation:

| Ingredient | (Weight %) |
|---|---|
| Aqueous dispersion (Example 2) | 9.8 |
| Emulsifiers | 1.5 |
| Sugars | 28.5 |
| Flour | 24.1 |
| Pregelatinized Starch | 0.8 |
| Leavening Agents | 0.8 |
| Flavors & Colors | 0.6 |
| Liquid Egg whites | 19.6 |
| Water | 14.2 |
| Preservative | 0.1 |

The batter ingredients were mixed in a two-stage continuous mixer and baked in loaf pans. The resulting cake had excellent grain, texture and volume and was commercially-acceptable after 7 days of ambient storage. The moisture content of the freshly bakes cakes was 42.9% by weight.

EXAMPLE 4 A sweet dough was produced using conventional sponge and dough processing and the following composition:

| | (Weight %) |
|---|---|
| Sponge: | |
| Patent Flour | 22.5 |
| Emulsifier | 0.2 |
| Yeast Food | 0.1 |
| Fresh Yeast | 2.2 |
| Water | 15.7 |
| Dough: | |
| Patent Flour | 26.7 |
| Sugar | 9.2 |
| Non-Fat Milk Solids | 1.7 |
| Egg Whites Solids | 1.5 |
| Flavors & Colors | 1.3 |
| Fresh Yeast | 1.7 |
| Water | 3.9 |
| Emulsifier | 1.6 |
| Aqueous Dispersion (Example 2) | 11.7 |

The sponge ingredients were mixed together for 3 minutes on 2nd speed in a 12-quart bowl using a dough hook and a Hobart TM A-200 mixer. The sponge was set to ferment for one hour. To mix the dough all ingredients were placed in the Hobart TM bowl and mixed for 30 seconds on 1st speed and 10 minutes on 3rd speed until the dough was fully developed. The dough was then divided, rounded, molded into loaf-shaped form and proofed for 70 minutes at 90° F. (32.2° C.) and 80% R.H. The dough loaves were baked for 23 minutes at 380° F. (193.3° C.).

The resulting loaves had excellent grain, texture and volume and were commercially-acceptable after five days of ambient storage.

EXAMPLE 5

Hamburger rolls were prepared using a conventional dough formulation as a control and a variant dough formulation wherein a portion of the water in the conventional formulation was replaced by an equal amount of water from a 10% solids aqueous dispersion (based on weight of water), using the solids distribution of the aqueous dispersion Example 2.

| Ingredient | Control (weight %) | Variant (weight %) |
|---|---|---|
| Water | 30.9 | 23.3 |
| Aqueous Dispersion | — | 8.2 |
| Compressed Yeast | 1.9 | 1.9 |
| Bread Flour | 53.7 | 52.7 |
| Salt | 0.8 | 0.7 |
| Sugar | 5.1 | 5.1 |
| Non-Fat Milk Solids | 2.5 | 2.5 |
| Vegetable Shortening | 5.1 | 5.1 |

The dough ingredients were mixed for 12 minutes and had a dough temperature of 87° F. (30.6° C.) out of the mixer. Floor time was 25 minutes.

The dough was divided into 2.25 ounce (63.8 g) pieces shaped into rolls and proofed for 20 minutes at 88° F. (31.1° C.) and 80% relative humidity. The dough pieces were baked at 440° F. (226.7° C.) until done. The variant rolls were judged to have better volume, softer crumb, darker crust color, and had a shorter bake time than the control rolls.

EXAMPLE 6 Hamburger rolls were made using conventional sponge and dough processing and the following formulation:

|  | (Kilograms) |
|---|---|
| Sponge: |  |
| High Protein Flour | 127.00 |
| Water | 74.39 |
| Yeast Food | 0.68 |
| Compressed Yeast | 7.26 |
| Emulsifier | 0.91 |
| Vitamins & Minerals | 0.06 |
| Dough: |  |
| High Protein Flour | 54.43 |
| Water | 19.96 |
| High Fructose Corn Syrup (42) | 21.77 |
| Compressed Yeast | 1.36 |
| Salt | 3.63 |
| Mold Inhibitor | 0.45 |
| Dough Conditioner | 0.91 |
| Potassium Bromate | (3 tablets) |
| Aqueous Dispersion (Example 2) | 9.07 |

The sponge and the dough ingredients were mixed for 1 minute at low speed and 7 minutes at high speed. The dough was divided, proofed for about an hour at 103° F. (39.4° C.) dry bulb and 95° F. (35° C.) wet bulb temperatures and baked for 7.5 minutes at about 405° F. (207.2° C.). The resulting rolls possesses a slightly lower volume, but stayed softer longer and had a better flavor when compared to conventional commercial rolls which usually have a small amount of fat.

EXAMPLE 7

A danish dough was produced using a conventional straight dough with a roll-in mixture for lamination effect.

| Dough: | Weight % |
|---|---|
| Water | 21.0 |
| Flour | 46.5 |
| Sugar | 10.4 |
| Yeast, Fresh | 2.9 |
| Salt | 0.7 |
| Non-fat Milk Solids | 3.1 |
| Egg White Solids | .7 |
| Emulsifier | 1.7 |
| Yeast Food | .1 |
| Flavors | 1.2 |
| Aqueous Dispersion (Example 2) | 11.7 |
|  | 100.0 |

All ingredients were mixed together for 5 minutes on 2nd speed in a 12-quart bowl using a dough hook on a Hobart A-200 mixer. Dough temperature was 62° F. (16.7° C.) after mixing. The dough was then sheeted.

Butter, margarine or a fat-free roll-in material could be utilized for forming the laminated danish dough.

The roll-in mixture was applied to the sheeted dough piece at a ratio of approximately 1 to 3 (roll-in/dough), using typical danish roll-in, sheeting and folding procedures. The finished dough piece has approximately 24 layers of dough/roll-in mix. The dough was sheeted to a thickness of about ¾ inch (19 mm). The dough piece was divided into smaller pieces about 1½ inches (38 mm) by 16 inches (406 mm) and weighing 15 ounces (425 g). The dough piece was spiraled and then formed into a ring with the ends overlapping and pressed together. The danish ring was placed on a lightly greased baking pan. The ring was proofed at 90° F (32.2° C.), 80% R.H. for 60 minutes. The ring was baked at 380° F. (193.3° C.) for 25 minutes. The resulting ring exhibited flat, oval grain structure with typical danish appearance and good volume. The baked, danish ring has texture and flavor and was commercially-acceptable after several days of ambient storage.

EXAMPLE 8

Oatmeal-raisin cookies were prepared using the following ingredients:

| Ingredient | (Weight %) |
|---|---|
| Sugar | 27.0 |
| Aqueous Dispersion (Example 2) | 8.1 |
| Molasses | 6.4 |
| Salt | 0.4 |
| Egg Whites Solids | 0.6 |
| Milk Solids Non Fat | 0.5 |
| Maltodextrin | 1.1 |
| Leavening Agents | 1.1 |
| Spices | .2 |
| Flavors | .3 |
| Emulsifiers | .1 |
| Water | 5.9 |
| Oats | 16.1 |
| Flour | 18.8 |
| Raisins | 13.4 |
|  | 100.0 |

The ingredients were mixed together for 3 minutes on 1st speed in a 12-quart bowl using a flat paddle on a Hobart A-200 mixer. The resulting dough was divided into approximately one-half ounce pieces and placed on a cookie baking pan. The cookies were baked for 9 minutes in a 400° F (204.4° C.) oven. The resulting cookies were soft and chewy and are commerically acceptable after several days of ambient storage.

| Ingredient | (Weight %) |
|---|---|
| Water | 14.1 |
| Flour | 38.3 |
| Yeast | 1.0 |
| Emulsifier | .7 |
| Yeast Food | .2 |
| Fiber, Wheat | 3.4 |
| Aqueous Dispersion (Example 2) | 35.2 |
| Vital Wheat Gluten | 4.2 |
| Sugar | 1.7 |
| Vinegar | .4 |
| Salt | .8 |
| | 100.0 |

All ingredients were mixed together in a 20-quart bowl with a dough hook on a Hobart ™ A-200 mixer, one minute on 1st speed, 10 minutes on 2nd speed. The dough fermented for 1 hour, then was divided into 26.25 ounce (744g) dough pieces and rounded with floor time (resting time) of 10 minutes. The rounded pieces were then moulded into typical bread loaves and deposited into baking pans. The loaves were proofed at 85% R.H. and 95° F. (35° C.) for 70 minutes. The loaves were then baked at 425° F. (218.3° C.) for 22 minutes and removed from the pan for cooling. The loaves exhibit excellent volume, cell structure and soft texture. The loaves were commercially acceptable after five days.

EXAMPLE 10

A high-fiber bread was made in accordance with Example 9 with the substitution of an aqueous dispersion having a 20% solids content consisting of 1 part xanthan, 1 part guar, 8 parts milk solids non-fat and 10 parts oat fiber for the aqueous dispersion of Example 2. For such products the amount of hydrated insoluble fiber added to the dough from the aqueous dispersion is relatively high, here 8.1 parts per 100 parts of flour, and will typically be on the order of 6 to 12 parts hydrated insoluble fiber per 100 parts of flour. Additional insoluble fiber may be added to the dough as a dry ingredient, typically at a level of from 2 to 10 parts, preferably 2 to 6 parts, per 100 parts of flour. A fat-free, high-fiber bread made in accordance with this example has good taste, texture and consumer acceptance.

EXAMPLE 11

A fat-free, high-ratio cake was prepared with non-chlorinated flour. Typically, non-chlorinated flour dictates that the sugar level in the cake batter be less than the flour level (i.e., low-ratio). Chlorinated flours enable the production of high-ratio cakes; however, the use of chlorinated flour is restricted by some governmental agencies.

| Ingredient | (Weight %) |
|---|---|
| Sugars | 23.6 |
| Emulsifier | 0.8 |
| Nonfat dry milk | 2.7 |
| Flour, non-chlorinated | 19.5 |

-continued

| Ingredient | (Weight %) |
|---|---|
| Maltodextrin | 2.3 |
| Starches | 6.5 |
| Aqueous Dispersion (Example 2) | 6.8 |
| Water | 17.8 |
| Egg Whites | 18.0 |
| Flavors | 0.7 |
| Salt | 0.3 |
| Leavening Agents | 0.9 |
| Preservative | 0.1 |
| Color | <0.1 |

Mix all of the ingredients until a smooth batter is formed. Run the batter through a continuous mixer to obtain a specific gravity of 0.925. The batter was distributed to loaf pans at 15.5 ounces (440 g) per pan and baked at 380° F. (193.3° C.) for about 40 minutes until golden brown. The resulting cake had good volume, grain and color as compared to conventional, high-ratio cakes made with chlorinated flour and were preferred to conventional low-ratio cake made with non-chlorinated flour.

EXAMPLE 12

A low-ratio cake was produced with non-chlorinated flour. The cake batter formulation is typical of European, low-ratio cakes with the aqueous dispersion of this invention included as an addition.

| Ingredient | (Weight %) |
|---|---|
| Whole eggs | 15.4 |
| Sugar | 18.2 |
| Flour, nonchlorinated | 30.3 |
| Butter | 15.2 |
| Leavening Agents | 1.2 |
| Milk | 15.2 |
| Aqueous Dispersion | 4.5 |

The butter and sugar were creamed together at room temperature and then heat was applied to produce a light and airy texture. The aqueous dispersion was warmed and then added to the butter-sugar blend while mixing was continued. Thereafter the eggs were warmed and slowly added. The flour was presifted, added to the above mix together with the leavening agents, and mixed just until these ingredients are incorporated. Milk is warmed and mixed in until a smooth batter is formed. Overmixing is avoided. The batter was distributed into loaf pans and baked at 360° F. (182.2° C.) for about 28 to 30 minutes, until golden brown. The resulting cake had good volume, color and grain. The cake was as firm but less dry than the conventional low-ratio cake and was preferred thereto.

EXAMPLE 13

A fat-free, low-ratio cake was produced with non-chlorinated flour. The cake batter formulation is free of butter, whole eggs and whole mike but contains the aqueous dispersion of this invention.

| Ingredient | (Weight %) |
|---|---|
| Sugar | 19.2 |
| Flour, non-chlorinated | 32.1 |
| Leavening Agents | 1.3 |
| Aqueous Dispersion (Example 2) | 14.4 |
| Egg Whites | 14.4 |
| Nonfat dry milk | 2.5 |

| Ingredient | (Weight %) |
|---|---|
| Water | 16.1 |

The aqueous dispersion was warmed and then creamed together with the sugar; thereafter, warmed egg whites were blended in. The flour was presifted and mixed into the blend along with leavening agents. The nonfat dry milk was reconstituted in warmed water, added to the above mixture and mixed until a smooth batter is formed. The batter was distributed into loaf pans and baked at 360° F. (182.2° C.) for about 25 to 28 minutes until golden brown. The resulting cake was an acceptable fat-free cake having an acceptable grain and a better volume than conventional fat-containing low-ratio cakes.

We claim:

1. A method for preparing a baked good comprising the steps of hydrating polysaccharide hydrocolloid, insoluble fiber and protein materials, incorporating the hydrated materials into a flour-containing mixture selected from the group consisting of doughs and batters, wherein the level of addition of the polysaccharide hydrocolloid is from 0.1 to 4.0 parts hydrocolloid on a dry basis per 100 parts flour, and thereafter, baking the batter or dough to produce a baked good.

2. The method of claim 1 wherein the level of addition of the polysaccharide hydrocolloid is from about 0.25 to 2.0.

3. The method of claim 1 wherein the hydrated materials are added in the form of an aqueous dispersion.

4. The method of claim 3 wherein the aqueous dispersion has a viscosity of at least 4.0 Brookfield units at 40° F.

5. The baked good produced by the method of claim 3.

6. The baked good of claim 5 wherein the baked good is essentially fat-free.

7. The baked good of claim 5 wherein the polysaccharide hydrocolloid consists of non-gelling gums.

8. The baked good of claim 5 wherein the polysaccharide hydrocolloid is comprised of anionic gum and galactomannan gum.

9. The baked good of claim 8 wherein the polysaccharide hydrocolloid consists of anionic gum and galactomannan gum at a weight ratio of from 1:4 to 4:1.

10. The baked good of claim 8 wherein the anionic gum contains a carboxylic acid group in its molecular structure.

11. The baked good of claim 10 wherein the anionic gum is xanthan gum.

12. The baked good of claim 10 or 11 wherein the galactomannan gum is guar gum.

13. The baked good of claim 5, 6 or 8 wherein the hydrated insolube fiber is present in the flour-containing mixture at a level of from 0.1 to 5.0 parts insoluble fiber per 100 parts flour.

14. The baked good of claim 13 wherein the fiber level is from 0.1 to 2 parts per 100 parts of flour.

15. The baked good of claim 13 wherein the weight ratio of polysaccharide hydrocolloid to fiber in the dispersion is from 1:0.8-6.

16. The baked good of claim 15 wherein the fiber is cereal grain fiber.

17. The baked good of claim 16 wherein the fiber is selected from the group consisting of oat fiber, soy fiber, wheat fiber and combinations thereof.

18. The baked good of claim 13 wherein hydrated protein is present in the flour-containing mixture at a level of from 0.1 to 8 parts per 100 parts of flour.

19. The baked good of claim 18 wherein the weight ratio of polysaccharide hydrocolloid to protein in the dispersion is from 1:1.1-4.5.

20. The baked good of claim 19 wherein the protein is selected from the group consisting of milk protein, egg albumen, wheat protein and combinations thereof.

21. The baked good of claim 8 or 9 wherein the weight ratio of polysaccharide hydrocolloid to insoluble fiber to protein in the dispersion is 1:0.8-6:1.1-4.5.

22. The baked good of claim 21 wherein the weight ratio is 1:0.8-3.5:1.5-3.5.

23. The baked good of claim 22 wherein the weight ratio is 1:1.5-2.0:2.0-3.0.

24. The baked good of claim 5 wherein the flour-containing mixture contains hydrated polysaccharide hydrocolloid, hydrated insoluble fiber and hydrated protein material at a weight ratio of polysaccharide hydrocolloid to insoluble fiber to protein of 1:0.8-6:1.1-4.5.

25. The baked good of claim 24 wherein the baked good is essentially fat-free.

26. The baked good of claim 5, 6, 24 or 25 wherein the baked good is a cake produced from a batter.

27. The cake of claim 26 wherein the flour in the cake batter consists of non-chlorinated flour.

28. The baked good of claim 5, 6, 24 or 25 wherein the baked good is a cookie.

29. The baked good of claim 5, 6, 24 or 25 wherein the baked good is a bread or roll.

30. The baked good of claim 5, 6, 24 or 25 wherein the baked good a sweet good produced from a dough.

31. The baked good of claim 5, 6, 24 or 25 wherein the baked good is a laminated sweet good produced from a dough.

32. An edible aqueous dispersion having a paste-like consistency and a Brookfield viscosity of at least 6 at 40° F. and comprising from 2 to 35% solids by weight of polysaccharide hydrocolloids, insoluble fiber and protein in water and wherein the weight ratio of polysaccharide hydrocolloid to insoluble fiber to protein is 1:0.8-6:1.1-4.5.

33. The edible dispersion of claim 29 wherein the hydrocolloids are comprised of anionic gum and galactomannan gum at a ratio of 1:4 to 4:1.

34. The edible dispersion of claim 32 or 33 wherein the dispersion is free of emulsifiers.

35. The edible dispersion of claims 32 or 33 wherein the dispersion contains emulsifier at a level which is below the level of polysaccharide hydrocolloid.

36. The edible dispersion of claim 32 wherein the solids level of polysaccharide hydrocolloid, insoluble fiber and protein in water is from 5% to 30%.

37. The edible dispersion of claim 32 wherein the solids level of polysaccharide hydrocolloid, insoluble fiber and protein in water is from 9% to 25%.

* * * * *